United States Patent [19]

Barea

[11] Patent Number: 5,225,988
[45] Date of Patent: Jul. 6, 1993

[54] DEVICE FOR CONTROLLING THE OPERATION OF MACHINES, PARTICULARLY TEXTILE MACHINES, ABEL TO SELF-LEARN THE OPERATING CYCLE OF THESE LATTER AND TO CORRECT ITS OWN ERRORS DURING THIS SELF-LEARNING STAGE

[76] Inventor: Tiziano Barea, 21052 Busto Arsizio Via Minghetti, 21, Varese, Italy

[21] Appl. No.: 722,871

[22] Filed: Jun. 28, 1991

[30] Foreign Application Priority Data

Jul. 10, 1990 [IT] Italy ................................ 20894 A/90

[51] Int. Cl.⁵ ...................... G06F 15/46; D04B 35/10
[52] U.S. Cl. ..................................... 364/470; 66/218; 66/163
[58] Field of Search .................. 364/470; 66/157, 163, 66/166, 218, 231, 232; 139/1 R

[56] References Cited

U.S. PATENT DOCUMENTS

| | | |
|---|---|---|
| 3,613,743 | 10/1971 | Sakamoto .............................. 66/166 |
| 4,550,278 | 10/1985 | Yamanaka . | |
| 4,744,227 | 5/1988 | Whitener, Jr. et al. .............. 66/163 |
| 4,835,699 | 5/1989 | Mallard ................................ 364/470 |
| 5,136,499 | 8/1992 | Rydborn ............................. 364/470 |

FOREIGN PATENT DOCUMENTS

| | | |
|---|---|---|
| 3227292 | 1/1984 | Fed. Rep. of Germany . |
| 8808048 | 10/1988 | PCT Int'l Appl. . |
| 2067307 | 7/1981 | United Kingdom . |

*Primary Examiner*—Joseph Ruggiero
*Assistant Examiner*—Steven R. Garland
*Attorney, Agent, or Firm*—Steinberg & Raskin

[57] ABSTRACT

A device for controlling the cyclic operation of a machine, in particular a textile machine, is of the type able to self-learn each machine working cycle. It is arranged to compare data obtained by suitable sensors during normal operation of the machine with data obtained by the same sensors during the self-learning cycle, and a control unit arranged to halt the machine when a discrepancy between the data occurs. The central unit modifies the data of the self-learning cycle when an error which is repeated constantly with time is noted for one and the same sensor.

8 Claims, 1 Drawing Sheet

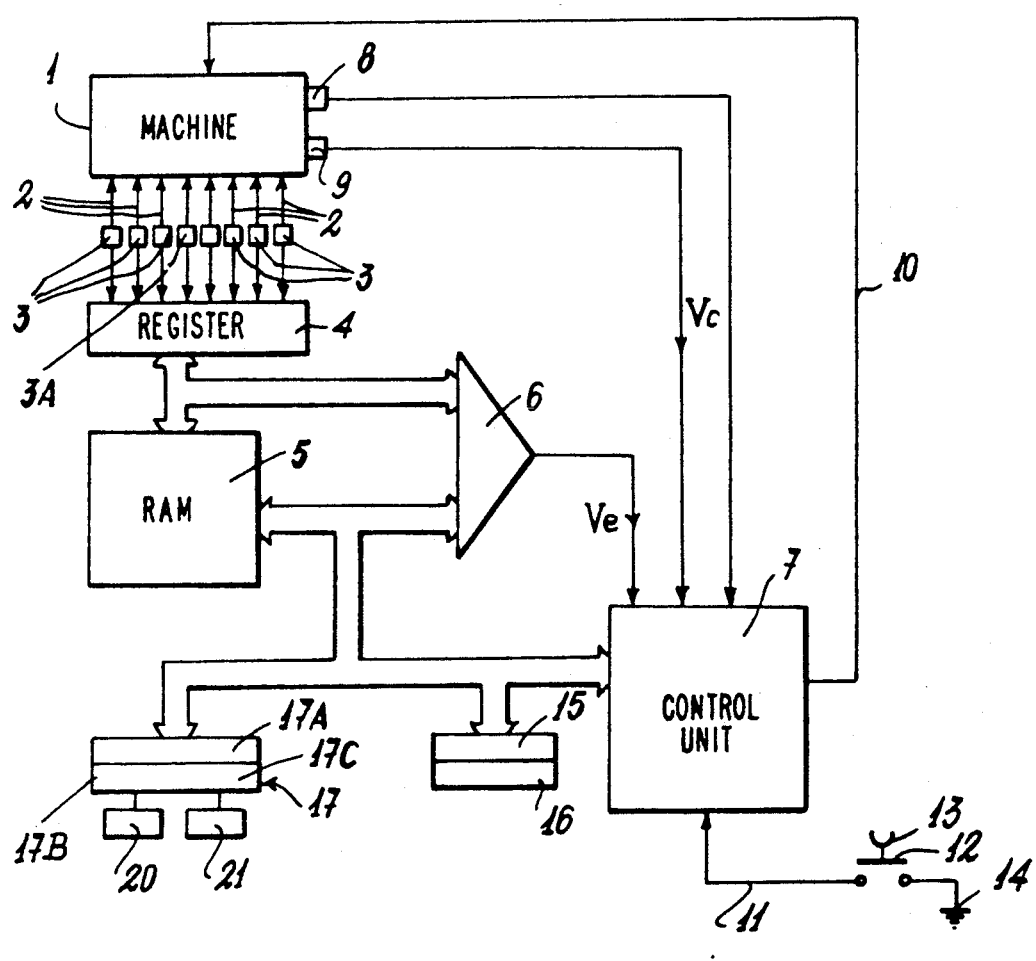

DEVICE FOR CONTROLLING THE OPERATION OF MACHINES, PARTICULARLY TEXTILE MACHINES, ABEL TO SELF-LEARN THE OPERATING CYCLE OF THESE LATTER AND TO CORRECT ITS OWN ERRORS DURING THIS SELF-LEARNING STAGE

This invention relates to a device for controlling the operation of machines, particularly textile machines.

Devices are already known for controlling the operation of machines of the aforesaid type. These devices are able, during a stage preceding the production stage, to implement a learning or self-learning cycle for the production stage itself.

The devices of this type, which are of known operation, comprise, in the case of one type for application to a textile machine, means for monitoring the movement of the yarns used for forming the fabric, means for sensing the commencement of the machine production cycle, means for measuring the operational velocity of the machine, means for memorizing data or information regarding yarn movements required to produce a master fabric, comparator means for comparing the yarn movements during fabric production with the master yarn movements, means for detecting any error between the yarn movements relating to the master fabric and the subsequent movements, and means for halting the machine when such an error is determined.

Although a device of this type enables the fabric production to be automatically controlled, it has certain drawbacks. Firstly, during the learning stage for the master fabric production ("master cycle" stage), false information can be generated and memorized, for example relative to the yarn movement (false movement due to suction, or mistakes due for example to the accidental or erroneous movement of yarns which at that particular moment should not have been involved).

This false information results in inaccurate learning of the master fabric production cycle. This may mean that during production the means for stopping the machine operation act on the machine to halt production even if the fabric is being accurately produced. This action occurs because the product is not being formed in accordance with the (inaccurate) master cycle.

In addition, for the aforesaid reasons the continuous machine stoppages result in extended production time and consequent increase in the cost of the article.

Moreover, after recognizing an error in the master cycle and before being able to start production, known devices must either be reprogrammed or undergo a new learning stage. This obviously results in increased production time ans cost, with obvious drawbacks for the finished product.

To this can be added the fact that the devices of the aforesaid type cannot be applied to machines, such as textile machines, in which random errors occur at each cycle during production because they are related to the inherent characteristics of the machine.

An object of the present invention is therefore to provide a device which is able both to self-learn the operating cycles of a machine, such as a textile machine, and to recognize its own errors during the learning of such cycles.

A further object is to provide a device able to correct its errors without halting production when it discovers such errors.

A further object is to provide a device which does not cause undesirable stoppage and hence downtime of the machine with which it is associated.

A further object is to provide a device of the aforesaid type which is reliable and can also be associated with machines which by virtue of their characteristics induce random errors during production which do not however influence the quality of the product.

These and further objects which will be apparent to the expert of the art are attained by a device of the stated type able to self-learn a machine production cycle, characterised in that the memory means are connected to comparison means arranged to compare the master data i.e. the data relative to the master fabric production, with the instantaneous data relative to the fabric under production, said data or information being generated by sensor means located in positions corresponding with said yarns, said comparison means being connected to control means arranged to act on the machine, to interrupt its operation, following an error signal emitted by the comparison means, said control means establishing which sensor means has emitted a real data item dissimilar to the corresponding master data item and how many times said sensor means has generated said data item, said control means then modifying said master data item fed into the memory means if the error or the real data dissimilarity is repeated constantly with time.

The present invention will be more apparent from the accompanying drawing which is provided by way of non-limiting example and in which the single FIGURE represents a block diagram of a device constructed in accordance with the invention.

Said FIGURE shows a machine 1, such as a textile machine, receiving yarns 2 which are fed to said machine in any known manner. This machine undergoes repetitive production cycles to produce for example stockings, jerseys and similar articles of clothing.

In positions corresponding with said yarns there are provided relative sensors 3, for example of the type able to sense both the movement and the velocity of each individual yarn.

These sensors are connected to a buffer register 4 to which a random access memory (or RAM) 5 and an analog or digital comparator member 6 are connected.

Said comparator 6, which is also directly connected to the RAM 5, is connected to a control unit 7 advantageously of microprocessor type.

Usual measurement means 8 and 9 are connected to this latter to generate in known manner data regarding the number of revolutions of the drive shaft (not shown) of the machine 1 and data relative to the beginning and end of each machine working cycle.

The unit 7 is directly connected to the machine 1 via a line 10 so that the unit 7 can act on the machine motor via said line to halt its operation.

This control unit is also connected to a line 11 containing a contactor 12 operated by a pushbutton 13, said line being connected to an earthing point.

Finally, the unit 7 is connected to counters 15 and 16, to the RAM 5 and to a further memory member 17 to contain the information regarding which of the sensors 3 has sensed a real data item not corresponding to a master data item present in the RAM 5.

With regard to the use of the device, the machine 1 is started and implements a learning cycle for learning the working operations which the machine is to execute.

During this cycle, the sensors 3 acquire master data (concerning said working operations) and feed these data to the buffer register 4, and from here to the RAM 5 in known manner.

At the same time the measurement means 8 and 9 feed their data to the control unit 7.

Having accomplished said learning (or self-learning) cycle, the machine 1 commences production.

During this production, each sensor 3 feeds its data (real, i.e. relative to the production) to the comparator 6, which compares them with the (master) data present in the RAM 5. If there is no difference between these data, said comparator generates for example a zero error signal $V_E$ with the result that the unit 7 does not halt the machine 1.

The unit 7 therefore knows the state of each yarn 2 during production.

It will now be assumed that one of the sensors (for example that indicated by 3A in the single FIGURE) generates a (real) data item which differs from the master data present in the RAM 5.

In this case the comparator 6 notes the difference between these data and generates an error signal $V_E$ other than zero and feeds it to the unit 7. This then halts the machine 1 on the basis of said signal $V_E$.

Following manual resetting of the machine operation via the pushbutton 13, the unit 7 deposits a series of data (as specified hereinafter) regarding the error noted in the memory member 17.

This latter contains a plurality of memory cells (for example those indicated by 17A, B, C in the accompanying FIGURE) into which data regarding the address of the RAM 5 containing the master data item which on comparison with the real data caused the stoppage of the machine 1 (17A), data regarding the type of error encountered, i.e. whether the RAM data item related to a broken or uncut yarn (17B), and data regarding which sensor has sensed the error (17C) are fed. In addition to said data, the unit 7 feeds data regarding the number of cycles undergone since the first error to a counter 20, and data regarding the number of cycles executed with the same error to a counter 21.

When said data have been stored in the memory member 17 and in the counters 20 and 21 (connected advantageously to said member), at each end-of-cycle signal $V_C$ from the measurement means 9 the unit 7 increments the data in the counter 20, which also contains the data regarding which sensors 3 have sensed an error.

Then during a subsequent cycle, following the determination of further errors, for each new error the unit 7 deposits the aforesaid data in the member 17 and increments the counter 21 relative to those sensors which have already given error indications during a previous cycle.

On termination of this subsequent cycle the unit 7 again increments the counter 20.

On termination of each working cycle, the data contained in the memory member 17 and in particular in the counters 20 and 21 connected to it are compared with data contained in counters 15 and 16 which represent limit value registers.

These latter contain previously set limit values which, when exceeded, result in the unit 7 making any necessary correction to the data present in the RAM 5. In particular, the counter 15 contains information relative to the maximum number of working cycles which the machine 1 may effect after the first error determined by any sensor (for example three cycles), and the contactor 16 contains information relative to the number of cycles to be effected with the same type of error before making the correction.

As stated, on termination of each working cycle the data present in the counters 20 and 21 is compared with the (limit) data present in the counters 15 and 16.

For this purpose, the unit 7 firstly reads the data in the counter 20 (i.e. the number of cycles during which an error or difference between a real and a master data item has been noted by a given sensor) and compares these data with the data in the counter 15.

If these data correspond (equal number of cycles with errors), the unit 7 reads the contents of the counter 21 (i.e. data relating to which sensors have determined errors) and compares these data with the data contained in the counter 16.

If these data correspond, the unit 7 senses that a data acquisition error has occurred during the self-learning cycle and cancels this data item from the RAM 5, or rather modifies the content of the memory relative to that sensor which has sensed the faulty master data and has caused a series of unjustified stoppages of the machine 1 (stoppages which will have occurred each time the comparison between the master and real data has shown an error or difference).

Finally, having made the correction in the RAM 5, the unit 7 cancels from the memory member 17 all that sensor data which had necessitated the correction to the RAM 5. This also clears memory cells for possible further corrections arising during subsequent controls cycles.

However, if these data do not correspond or although an error has been noted during production this error has not been detected for the limiting number of cycles, the sensor which has produced the error signal has actually determined a production error. In this case the unit 7 can determine the effective working error and warn for example an operator of this fact.

At the same time the unit 7 cancels the data stored in the memory member 17 relative to those sensors which have not attained or exceeded the limiting value present in the counter 15.

A device such as that described overcomes the problems of known control devices for those machines, in particular textile machines, which involve self-learning of the working cycle.

What I claim is:

1. A device for controlling the operation of machines, particularly textile machines, of a type able to self-learn an operating cycle of these latter and comprising means for monitoring movement of yarns used for forming fabric, means for sensing commencement of a machine production cycle, means for measuring an operational velocity of a machine, means for memorizing data or information regarding yarn movements required to produce a master fabric, comparator means for comparing yarn movements during fabric production with the master yarn movements, means for detecting any error between the yarn movements relating to the master fabric and subsequent movements, and means for halting the machine when such an error is determined, said device being characterised in that the memory means are connected to comparison means arranged to compare the master data with the instantaneous data relative to fabric under production, said data or information being generated by sensor means located in positions corresponding with said yarns, said comparison means being connected to control means arranged to act on the machine, to interrupt its operation, following an error signal emitted by the comparison means, said control means establishing which sensor means has emitted a real data item dissimilar to the corresponding master data item and how many times said sensor means has generated said data item, said control means then modifying said master data item fed into the memory means if the error or the real data dissimilarity is repeated constantly with time.

2. A device as claimed in claim 1, characterised in that the comparison means are a comparator member.

3. A device as claimed in claim 2, characterised in that the comparator member is of digital type.

4. A device as claimed in claim 2, characterised in that the comparator member is of analog type.

5. A device as claimed in claim 1, characterised in that the control means are a control unit advantageously of microprocessor type.

6. A device as claimed in claim 1, characterised in that the control means cooperate with further memory means comprising a plurality of memory cells arranged to contain at least the data relative to an address of the memory means containing the master data item which on comparison with the real data generates the error, data regarding a type of error encountered, and data regarding which sensor or sensors have sensed the error, said further memory means being connected to counter means arranged to evaluate data at least regarding a number of working cycles undergone by the machine since the first encountered error and regarding a number of cycles executed containing the same type of error.

7. A device as claimed in claim 1, characterised in that the control means cooperate with at least one register containing threshold values with which the data inserted in the memory means are compared.

8. A device as claimed in claim 7, characterised in that the threshold values represent the maximum number of working cycles which the machine must undergo after the first error has been sensed by the comparator means, and a number of cycles to be undergone with the same type of error before the control means act on the memory means.

* * * * *